Dec. 7, 1965            Y. RAMUS            3,222,160
PROCESS FOR MANUFACTURING A HUMIC FERTILIZER
Filed Feb. 6, 1961
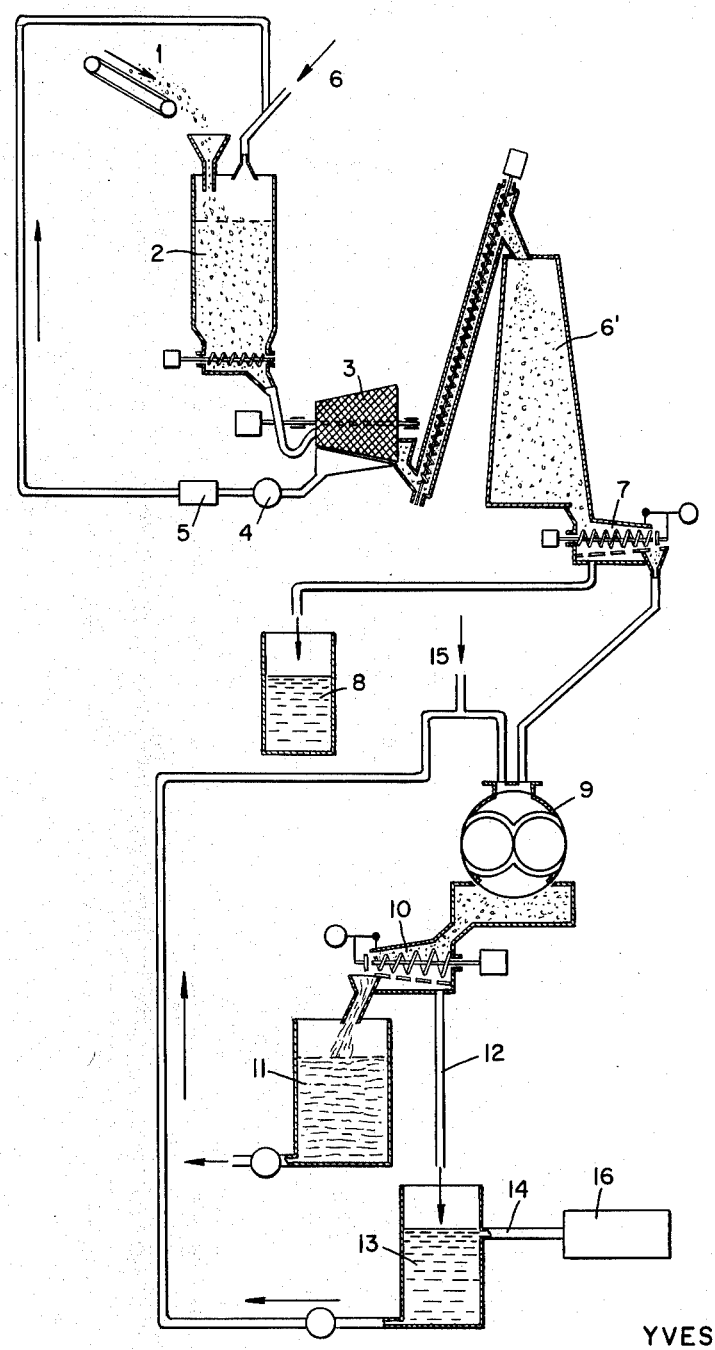
INVENTOR
YVES RAMUS
BY *Glascock, Downing & Seebold*
ATTORNEY 3,222,160
**PROCESS FOR MANUFACTURING
A HUMIC FERTILIZER**
Yves Ramus, Seyne-les-Alpes, France
Filed Feb. 6, 1961, Ser. No. 87,218
Claims priority, application Germany, Feb. 15, 1960,
E 18,894
7 Claims. (Cl. 71—23)

The invention relates to a new humic manure and to the process used to obtain it.

Processes involving the use of nitric acid to obtain pulp from plants are already known. The two main obstacles to the further development of these processes have consisted in two separate problems: that of regenerating the nitric acid used in order to make the project economically worthwhile, and that of disposing of waste liquid.

Recovery of the lignin as such does not materially contribute to solving the economic problem, owing to the very small interest attaching to the substance for industrial use.

The object of the present invention is to do away with these disadvantages and to render the nitric acid process economically worthwhile by making possible the obtention of a new industrial product suitable for use as a humic manure.

According to the invention, in the alkaline neutralizing treatment involved in the known processes, ammonia, potash, or lime is substituted for soda, thus obtaining a humic fertilizer with ammonium nitrate and/or potassium nitrate and/or calcium nitrate as its basic constituent.

While the use of soda is effectively to be utterly rejected when manufacturing manures, the applicant has recognized by way of experiment that there is, on the contrary, no contra-indication as regards the use of ammonium, potassium or calcium nitrates, obtained by the said process or of the corresponding oxalates or lignates, as fertilizers.

An embodiment of the invention will be described hereinafter, it being understood, however, that the applicant does not intend limiting the generic application of the invention to or by the specific features of the example chosen by way of illustration. In addition, the following references in the specification relating to "chips" are to be understood as being applicable to any fibrous vegetable material which, when treated with nitric acid, will produce cellulose. In particular, comminuted wood is a suitable example of such a fibrous vegetable material.

On their arrival via the conveyor 1 from the cutting machines or storage hopper, the chips are projected into the impregnating device 2. On evacuation from the latter, they enter a rotary truncated cone 3 with latticed sides, the axis of which being horizontal, where they are drained. The liquid thus drained off is returned by the pump 4, via a filter 5, to the impregnating device 2; the latter is also supplied, by inlet 6, with fresh liquid nitric acid to replace that which is carried away by the chips and so keep the concentration constant at the degree chosen.

As they leave the draining device, the chips, and the remaining nitric acid carried by said chips, are conveyed up to the inlet at the top of a kilning device 6', in which oxidization of the wood polyoses occurs. They are evacuated through an outlet at the bottom and pass into a screw-press 7. The liquid pressed out of them runs into a neutralizing tank 8. The chips, together with the impregnating solution remaining after the pressing operation, pass through a grinder 9, and the resulting pulp passes through a further screw-press 10.

The liquid pressed out is subjected to the processes which will be hereinafter described; the pulp passes into a scrubber 11 and from this point undergoes a treatment similar to that used in the ordinary processes of pulp manufacture.

The liquids flowing out of the bottom outlet of the kilning device 6', or pressed out of the chips before grinding, pass into the same tank 8, where they are neutralized and thus provide the desired fertilizer. It should be noted that the neutralization may take place before or after separating the cellulose from the liquid material. The neutralization is effected:

(a) With ammonia, the result being an ammonium nitrate solution with a small quantity of ammonium oxalate mixed with it. This solution may be concentrated by evaporation, or (b) With lime, the result being a calcium oxalate and a calcium nitrate precipitate.

When the chips have been through the press on leaving the kilning device and pass on to the grinder they are impregnated by a solution containing 3–5% of ammonia in sufficient volume to allow of satisfactory grinding. The pulp thus leaving the grinder enters the screw press 10 where most of the liquid is removed from it (the resultant substance having attained 50% dryness when it leaves the press); the liquid removed passes through pipe 12 and so back into the circuit, after its ammonia content and volume have been restored in the tank 13. The liquid, when it leaves the press 10, contains ammonium nitrate, a very small quantity of ammonium oxalate, and the lignin. Once the lignin is sufficiently concentrated for the solution to become viscous, a fraction (about 10%) is diverted from the circuit through 14, a fresh ammonia solution being added via inlet 15 to take its place. This latter solution is so proportioned as to restore the ammonia content and total volume of the original solution.

The fraction of the solution diverted is concentrated, in a conventional device 16, either by evaporation or by centrifugalization, thus forming a solid substance which can be crushed and sold commercially as an ammonium nitrate humic fertilizer.

If so desired, the neutralizing can be effected with potash.

The gases given off during kilning are drawn off together with excess air through one or more conventional recuperation towers provided with Raschig rings. The top of these towers is subjected to a jet of water or of acid in weak solution. The process involved is the well known one used for obtaining nitric acid from nitrous gases.

Alternatively, the gases can be conveyed via a compressor to a tower into which compressed air is introduced simultaneously through an inlet at the bottom, the top of the tower being provided with the above-mentioned jet system. Where this system is chosen, the tower should have cooling coils fitted inside it.

A partial recovery of the nitric acid is thus achieved.

The impregnating liquid for oxidation of the wood polyoses used in the kilning step consists of a nitric acid solution containing from 125 to 200 gms. per litre, according to the wood being treated and to the type of cellulose it is desired to obtain. Ammonia can be added to this solution, without heating, in the following proportions:

(a) Concentrations up to and including 167 gms. per litre: $1/1000$ of the quality of true $HNO_3$.

(b) More highly concentrated solutions; $2/1000$ of the quantity of true $HNO_3$.

The addition of $NH_3$ has the effect of facilitating the giving-off of the NO and of preventing the formation of lower nitrogen oxides not easily transformable into nitric acid.

What I claim is:

1. A process for manufacturing a humic fertilizer comprising impregnating a cellulosic containing material with a solution of nitric acid in an amount in excess of the amount capable of being absorbed by said cellulosic material, draining the excess of said solution, digesting said cellulosic material impregnated with nitric acid in order to produce celulose, separating said cellulosic material from the liquid therein, reacting said cellulosic material and liquid remaining therein with a compound selected from the group consisting of ammonia, potash and lime in an amount sufficient to neutralize said cellulosic material and liquid remaining therein in order to produce a neutralized solution of lignins and oxidized hemi-celluloses, comminuting said cellulosic material, separating said cellulosic material from the neutralized solution of lignins and oxidized hemi-celluloses contained therein, and concentrating said neutralized solution to produce a humic fertilizer material.

2. A process for manufacturing a humic fertilizer comprising impregnating a cellulosic containing material with a solution of nitric acid in an amount in excess of the amount capable of being absorbed by said cellulosic material, draining the excess of said solution, digesting said cellulosic material impregnated with nitric acid in order to produce cellulose, separating said cellulosic materials from the liquid therein, reacting said cellulosic material and liquid remaining therein with a compound selected from the group consisting of ammonia, potash and lime in an amount sufficient to neutralize said cellulosic material and liquid remaining therein in order to produce a neutralized solution of lignins and oxidized hemi-cellulose, comminuting said cellulosic material, separating said cellulosic material from the neutralized solution of lignins and oxidized hemi-celluloses contained therein, recycling a portion of said neutralized solution to the cellulosic material immediately prior to comminution thereof, and concentrating said neutralized solution to produce a humic fertilizer material.

3. A process for manufacturing a humic fertilizer comprising impregnating a cellulosic containing material with a solution of nitric acid in an amount in excess of the amount capable of being absorbed by said cellulosic material, draining the excess of said solution, digesting said cellulosic material impregnated with nitric acid in order to produce cellulose, separating said cellulosic material from the liquid therein, and then neutralizing the separated liquid with a compound selected from the group of ammonia, potash and lime in order to produce a material which can be used for the manufacture of fertilizers; and reacting said separated cellulosic material and liquid remaining therein with a compound selected from the group consisting of ammonia, potash and lime in an amount sufficient to neutralize said cellulosic material and liquid remaining therein in order to produce a neutralized solution of lignins and oxidized hemi-celluloses comminuting said cellulosic material, separating said cellulosic material from the neutralized solution of lignins and oxidized hemi-celluloses contained therein, and concentrating said neutralized solution to produce a humic fertilizer material.

4. A process for manufacturing a humic fertilizer comprising impregnating a cellulosic containing material with a solution of nitric acid in an amount in excess of the amount capable of being absorbed by said cellulosic material, draining the excess of said solution, digesting said cellulosic material impregnated with nitric acid in order to produce cellulose, separating said cellulosic material from the liquid therein, and then neutralizing the separated liquid with a compound selected from the group consisting of ammonia, potash and lime in order to produce a material which can be used for the manufacture of fertilizers; and reacting said separated cellulosic material and liquid remaining therein with a compound selected from the group consisting of ammonia, potash and lime in an amount sufficient to neutralize said cellulosic material and liquid remaining therein in order to produce a neutralized solution of lignins and oxidized hemi-celluloses, comminuting said cellulosic material, separating said cellulosic material from the neutralized solution of lignins and oxidized hemi-celluloses contained therein, recycling a portion of said neutralized solution to the cellulosic material immediately prior to comminution thereof, and concentrating said neutralized solution to produce a humic fertilizer material.

5. A process for manufacturing a humic fertilizer comprising impregnating a cellulosic containing material with a solution of nitric acid in an amount in excess of the amount capable of being absorbed by said cellulosic material, draining the excess of said solution, digesting said cellulosic material impregnated with nitric acid in order to produce cellulose, reacting said cellulosic material and liquid remaining therein with a compound selected from the group consisting of ammonia, potash and lime in an amount sufficient to neutralize said cellulosic material and liquid remaining therein in order to produce a neutralized solution of lignins and oxidized hemi-celluloses, comminuting said cellulosic material, separating said cellulosic material from the neutralized solution of lignins and oxidized hemi-celluloses contained therein, and concentrating said neutralized solution to produce a humic fertilizer material.

6. The process of claim 1 wherein the digestion takes place at temperature conditions resulting solely from the exothermic digestion step and takes place at normal pressure conditions.

7. The process of claim 3 wherein the digestion takes place at temperature conditions resulting solely from the exothermic digestion step and takes place at normal pressure conditions.

References Cited by the Examiner

UNITED STATES PATENTS

| 838,108 | 12/1906 | Hammevochlag | 71—24 |
| 1,933,445 | 10/1933 | Murdock | 71—25 |
| 2,574,027 | 11/1951 | Farber | 71—24 X |
| 2,735,756 | 2/1956 | Farber | 71—25 X |
| 2,838,877 | 6/1958 | Working | 71—23 X |
| 2,901,339 | 8/1959 | Boomer et al. | 71—23 |

FOREIGN PATENTS 361,890   11/1931   Great Britain.

OTHER REFERENCES

Lewis: "Chemical and Engineering News," vol. 23, No. 12, June 25, 1945, pages 1074–1080 (page 1077 of particular interest).

DONALL H. SYLVESTER, *Primary Examiner.*

MAURICE A. BRINDISI, ANTHONY SCIAMANNA,
*Examiners.*